United States Patent
Ishimura

(10) Patent No.: US 10,841,014 B2
(45) Date of Patent: Nov. 17, 2020

(54) OPTICAL RECEIVER AND COHERENT OPTICAL RECEPTION METHOD

(71) Applicant: KDDI CORPORATION, Tokyo (JP)

(72) Inventor: Shota Ishimura, Fujimino (JP)

(73) Assignee: KDDI CORPORATION, Tokyo (JP)

( * ) Notice: Subject to any disclaimer, the term of this patent is extended or adjusted under 35 U.S.C. 154(b) by 0 days.

(21) Appl. No.: 16/662,516

(22) Filed: Oct. 24, 2019

(65) Prior Publication Data

US 2020/0059302 A1  Feb. 20, 2020

Related U.S. Application Data

(63) Continuation of application No. PCT/JP2018/026998, filed on Jul. 19, 2018.

(30) Foreign Application Priority Data

Jul. 25, 2017  (JP) ................................. 2017-143411

(51) Int. Cl.
*H04B 10/61* (2013.01)
*G02B 5/30* (2006.01)
*G02B 27/28* (2006.01)

(52) U.S. Cl.
CPC ......... *H04B 10/614* (2013.01); *G02B 5/3025* (2013.01); *G02B 5/3083* (2013.01);
(Continued)

(58) Field of Classification Search
CPC .................................................. H04B 10/614
See application file for complete search history.

(56) References Cited

U.S. PATENT DOCUMENTS 10,116,410 B2 * 10/2018 Morsy-Osman ..... H04B 10/541
2004/0208646 A1 * 10/2004 Choudhary ........ H04B 10/5561
398/188

(Continued)

FOREIGN PATENT DOCUMENTS

JP    2015-136015 A    7/2015
WO    2019/021917 A1   1/2019

OTHER PUBLICATIONS

Ishimura et al., Polarization-diversity Stokes-analyzer-based coherent receiver, Mar. 2019, Optics Express (Year: 2019).*
International Search Report for PCT/JP2018/026998 dated Sep. 4, 2018.
Kikuchi Kazuro et al., Multi-level signaling in the Stokes space and its application to large-capacity optical communications, Optics Express, Mar. 24, 2014, pp. 7374-7387, vol. 22, No. 7, Section 2.1-23, Section 3.1-3.2, Figs. 5-7.

(Continued)

*Primary Examiner* — Jai M Lee
(74) *Attorney, Agent, or Firm* — Thomas Horstemeyer, LLP

(57) ABSTRACT

An optical receiver includes: a first combiner configured to output first combined light by combining local light of first polarization and signal light of second polarization; a converter configured to convert the first combined light to a first electric signal; a converter configured to covert a component of the first combined light that has passed through a first polarizer to a second electric signal; a converter configured to convert a component of the first combined light that has passed through a wave plate and a polarizer to a third electric signal; a divider configured to output a fourth electric signal and a fifth electric signal by branching the first electric signal; subtractors configured to subtract the fourth electric signal from the second electric signal and the fifth electric signal from the third electric signal.

10 Claims, 3 Drawing Sheets

(52) U.S. Cl.
CPC ......... *G02B 27/283* (2013.01); *H04B 10/616* (2013.01); *H04B 10/61* (2013.01)

(56) References Cited

U.S. PATENT DOCUMENTS

| | | | | |
|---|---|---|---|---|
| 2004/0218933 | A1* | 11/2004 | Fludger | H04B 10/67 398/205 |
| 2006/0159452 | A1* | 7/2006 | Tucker | G01J 4/04 398/41 |
| 2006/0171718 | A1* | 8/2006 | Hoshida | H04B 10/532 398/152 |
| 2012/0008951 | A1* | 1/2012 | Mikami | H04L 27/223 398/65 |
| 2014/0079390 | A1* | 3/2014 | Kim | H04B 10/0773 398/30 |
| 2014/0186057 | A1* | 7/2014 | Vacondio | H04B 10/2513 398/202 |

OTHER PUBLICATIONS

Xie Chongjin et al., Colorless coherent receiver using 3x3 coupler hybrids and single-ended detection, Optics Express, Jan. 4, 2012, pp. 1164-1171, vol. 20, No. 2, Chapter 2-3, Figs. 2(a)-2(b).

Extended European Search Report for European Patent Application No. 18837341.9 dated Jul. 16, 2020.

Benedetto et al., Theory of Polarization Shift Keying Modulation, IEEE Transactions on Communications, Apr. 1, 1992, pp. 708-721, vol. 40, No. 4, Institute of Electrical and Electronics Engineers, New York City, NY, US.

Benedetto et al., Direct Detection of Optical Digital Transmission Based on Polarization Shift Keying Modulation, IEEE Journal on Selected Areas in Communications, Apr. 1, 1995, pp. 531-542, vol. 13, No. 3, Institute of Electrical and Electronics Engineers, New York City, NY, US.

\* cited by examiner

OPTICAL RECEIVER AND COHERENT OPTICAL RECEPTION METHOD

CROSS-REFERENCE TO RELATED APPLICATION(S)

This application is a continuation of International Patent Application No. PCT/JP2018/026998 filed on Jul. 19, 2018, which claims priority to and the benefit of Japanese Patent Application No. 2017-143411, filed Jul. 25, 2017, the entire disclosures of which are incorporated herein by reference.

TECHNICAL FIELD

The present invention relates to an optical receiver of a coherent optical communication system and a coherent optical reception method.

BACKGROUND ART

A coherent optical communication system has been used in order to increase communication capacity. Usually, an optical receiver of the coherent optical communication system performs demodulation using two 90° optical hybrid circuits, four balanced receivers, and four analog/digital converters (ADCs) that respectively performs analog/digital conversion on the electric signals output from the four balanced receivers. Note that each balanced receiver outputs the difference between electric signals output from two photodiodes (PDs). That is, a known optical receiver needs two 90° optical hybrid circuits, eight PDs, and four ADCs.

Non-Patent Literature 1 (NPTL 1) discloses an optical receiver in which the number of components can be reduced relative to the known optical receiver. According to NPTL 1, two 3×3 couplers are used in place of the two 90° optical hybrid circuits, and with this, the number of PDs and ADCs are reduced to six and four, respectively. Specifically, the optical receiver of NPTL 1 first converts three optical signals output from one 3×3 coupler to electric signals using three PDs. Then, the optical receiver of NPTL 1 outputs two electric signals by performing weighted addition/subtraction of three electric signals output from these three PDs in an analog manner, and converts the two electric signals to digital signals using two ADCs.

CITATION LIST

Non-Patent Literature

NPTL 1: C. Xie et al., "Colorless coherent receiver using 3×3 coupler hybrid and single-ended detection", Opt. Express, vol. 20, 1164-1171, 2012.

SUMMARY OF INVENTION

Technical Problem

The optical receiver of Non-Patent Literature 1 needs to perform complicated weighted addition/subtraction of three electric signals in an analog domain. Therefore, Non-Patent Literature 1 discloses another configuration in which complicated addition/subtraction in an analog region is not needed. According to the other configuration, the optical receiver first converts three optical signals output from one 3×3 coupler to electric signals using three PDs. Then, three electric signals output from these three PDs are converted to digital signals using three ADCs, and thereafter complicated addition/subtraction is performed in a digital domain. That is, in the other configuration, two 3×3 couplers, six PDs, and six ADCs are used.

The present invention provides technology for realizing coherent optical reception with a simple configuration relative to a known configuration.

Solution to Problem

According to an aspect of the present invention, an optical receiver includes: a first combiner configured to output first combined light by combining local light of first polarization and signal light of second polarization that is orthogonal to the first polarization; a first converter configured to convert the first combined light to a first electric signal; a first polarizer configured to allow a component of polarization plane having an angle of 45 degrees relative to each of polarization planes of the first polarization and the second polarization to pass through; a second converter configured to covert a component of the first combined light that has passed through the first polarizer to a second electric signal; a first wave plate configured to delay light of the first polarization or the second polarization by ¼ wavelength; a second polarizer configured to allow a component of polarization plane having an angle of 45 degrees relative to each of polarization planes of the first polarization and the second polarization to pass through; a third converter configured to convert a component of the first combined light that has passed through the wave plate and the second polarizer to a third electric signal; a first divider configured to output a fourth electric signal and a fifth electric signal by branching the first electric signal; a first subtractor configured to subtract the fourth electric signal from the second electric signal; and a second subtractor for subtracting the fifth electric signal from the third electric signal.

Advantageous Effects of Invention

According to the present invention, coherent optical reception can be realized with a simple configuration relative to a known configuration.

Other features and advantages of the present invention will be apparent from the following description taken in conjunction with the accompanying drawings. Note that the same reference numerals denote the same or similar components throughout the accompanying drawings.

DESCRIPTION OF EMBODIMENTS

Hereinafter, illustrative embodiments of the present invention will be described with reference to the drawings. Note that the following embodiments are illustrative and do not limit the present invention to the contents of the embodiments. Also, in the following diagrams, constituent elements that are not required for describing the embodiments are omitted.

Figure 1:
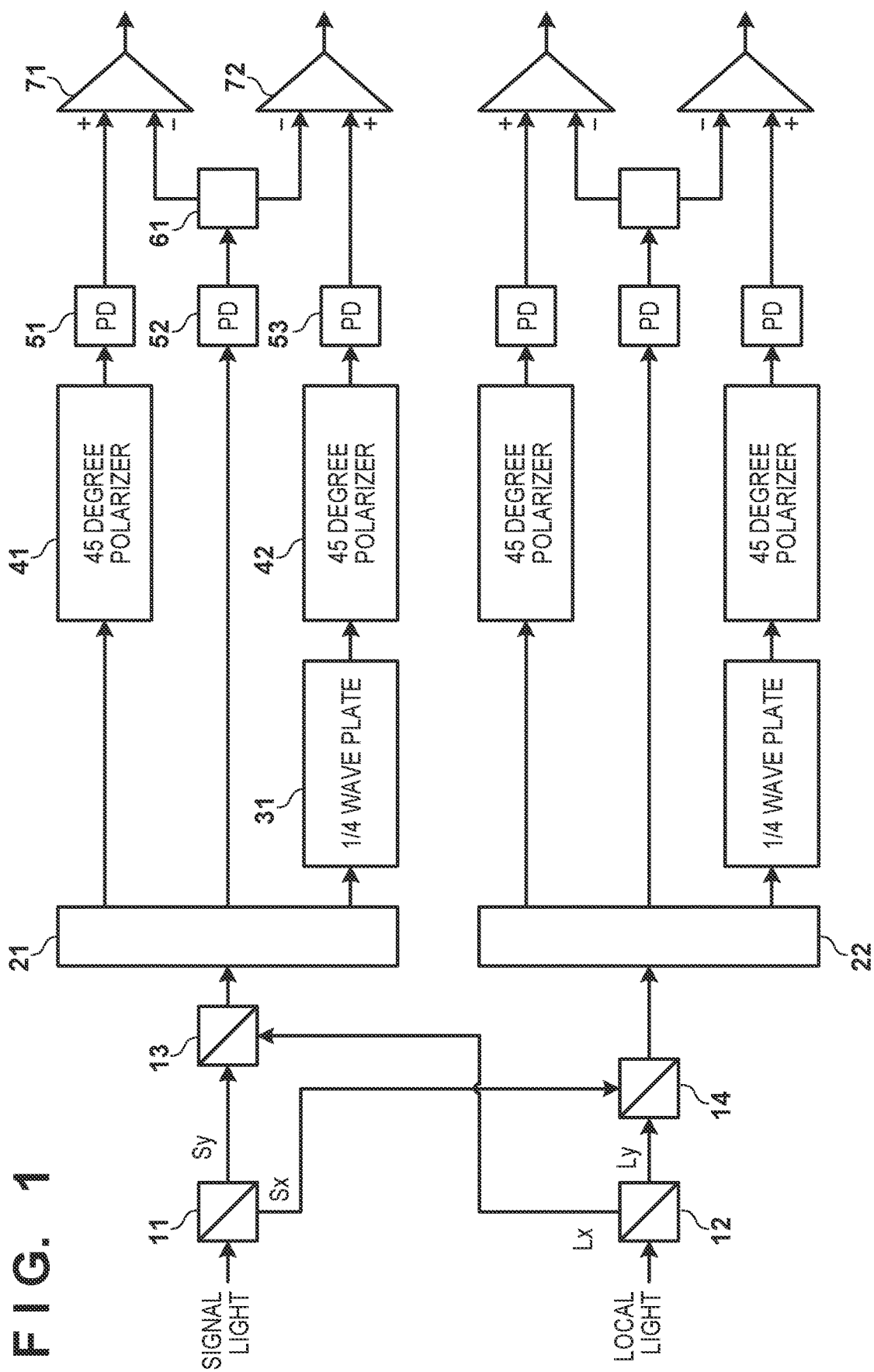
FIG. 1 is a configuration of an optical receiver according to one embodiment.

FIG. 1 is a configuration of an optical receiver according to one embodiment. Signal light from an optical transmitter is input to a polarization beam separator 11. The polarization beam splitter 11 polarization-separates the signal light, and outputs a Y polarized component Sy of the signal light to a polarization beam splitter 13, and outputs an X polarized component Sx of the signal light to a polarization beam splitter 14. Hereinafter, the X polarized component Sx and the Y polarized component Sy of the signal light are respectively referred to as signal light Sx and signal light Sy. On the other hand, local light generated by an unshown light source is input to a polarization beam splitter 12. The polarization beam splitter 12 polarization-separates the local light, and outputs a Y polarized component Ly of the local light to the polarization beam splitter 14, and outputs an X polarized component Lx of the local light to the polarization beam splitter 13. Hereinafter, the X polarized component Lx and the Y polarized component Ly of the local light are respectively referred to as local light Lx and local light Ly. Note that the X polarization plane and the Y polarization plane are orthogonal to each other. The polarization beam splitter 13 outputs an optical signal (combined light) including the signal light Sy and the local light Lx to a 1×3 coupler 21, and the optical beam splitter 14 outputs an optical signal (combined light) including the signal light Sx and the local light Ly to a 1×3 coupler 22. The 1×3 couplers 21 and 22 each branch the input optical signal to three optical signals having an equal amplitude (equal power), and outputs the three optical signals.

Because the three optical signals output from each of the 1×3 couplers 21 and 22 are to be subjected to the same processing, hereinafter, the processing to be performed on the three optical signals output from the 1×3 coupler 21 will be described. One of the three optical signals output from the 1×3 coupler 21 is input to a PD 52. The PD 52 outputs an electric signal corresponding to the power of the input optical signal to a branching unit (divider) 61. One of the three optical signals output from the 1×3 coupler 21 is input to a 45 degree polarizer 41. The 45 degree polarizer 41 allows only components (hereinafter, referred to as 45 degree components) of polarization plane having an angle of 45 degrees relative to each of the X polarization plane and the Y polarization plane to pass through. The optical signal that has passed through the 45 degree polarizer 41 is input to a PD 51. Therefore, the PD 51 outputs a beat signal of the 45 degree component of the signal light Sy and the 45 degree component of the local light Lx as an electric signal.

One of the three optical signals output from the 1×3 coupler 21 is, after passing through a ¼ wave plate 31, input to a 45 degree polarizer 42. In the present embodiment, the ¼ wave plate 31 delays Y polarized light by ¼ wavelength relative to X polarized light, and outputs the resultant light to a 45 degree polarizer 42. Note that the ¼ wave plate 31 may delay X polarized light by ¼ wavelength relative to Y polarized light. The 45 degree polarizer 42 allows only components (45 degree components) having an angle of 45 degrees relative to each of the X polarization plane and the Y polarization plane to pass through. The optical signal that has passed through the 45 degree polarizer 42 is input to a PD 53. Therefore, the PD 53 outputs a beat signal of the 45 degree component of the signal light Sy and the 45 degree component of the local light Lx as an electric signal. Note that the 45 degree component of the signal light Sy input to the PD 53 is delayed by ¼ wavelength by the ¼ wave plate 31.

The electric signal output from the PD 51 is input to a plus terminal of the subtracter 71, and the electric signal output from the PD 53 is input to a plus terminal of the subtracter 72. The electric signal output from the PD 52 is branched by a branching unit 61, and the branched electric signals are respectively input to minus terminals of the subtracters 71 and 72. Note that the amplitude of each of the two electric signals output from the branching unit 61 is assumed to be half the amplitude of the electric signal output from the PD 52. The subtracters 71 and 72 each output an electric signal obtained by subtracting the electric signal input to the minus terminal from the electric signal input to the plus terminal. The electric signals output from the subtracters 71 and 72 are converted to digital signals by unshown ADCs, and the digital signals are input to a processing circuit such as a DSP.

Next, the reason why demodulation is possible with the configuration in FIG. 1 will be described. In order to do this, first, the Stokes parameters with respect to a combined light including the signal light Sy and the local light Lx that is output from the 1×3 coupler 21 will be described. When the local light Lx is expressed by a complex number Ex, and the signal light Sy is expressed by a complex number Ey, the Stokes parameters $S_0$, $S_1$, $S_2$, and $S_3$ of the combined light are respectively expressed by the following equations.

$$S_0 = |Ex|^2 + |Ey|^2 \tag{1}$$

$$S_1 = |Ex|^2 - |Ey|^2 \tag{2}$$

$$S_2 = 2\text{Re}[Ex^*Ey] \tag{3}$$

$$S_3 = 2\text{Im}[Ex^*Ey] \tag{4}$$

Note that $Ex^*$ in Equations (3) and (4) is a complex conjugate of $Ex$, and Re and Im respectively mean extracting a real part and an imaginary part. As is apparent from Equations (3) and (4), $S_2+jS_3$ corresponds to a signal obtained by performing coherent detection on the signal light Sy, and the signal light Sy can be demodulated by calculating $S_2+jS_3$.

Note that the Stokes parameters $S_0$, $S_1$, $S_2$, and $S_3$ have a following relationship.

$$S_0^2 = S_1^2 + S_2^2 + S_3^2 \tag{5}$$

Next, the measurement of the Stokes parameters will be described. An optical signal, which is the measurement target, is branched into four signals having an equal amplitude (equal power), and the branched signals are respectively input to circuits 81 to 84 shown in FIG. 2. In the circuit 81 in FIG. 2, a PD outputs a current $I_0$ corresponding to the total light receiving amount of a branched light. In the circuit 82 in FIG. 2, only the light component of a reference polarization plane of the branch light is extracted using a 0 degree polarizer, and a PD outputs a current $I_1$ corresponding to this light component. In the circuit 83 in FIG. 2, the light component of a polarization plane having an angle of 45 degrees relative to the reference polarization plane is extracted from the branched light, and a PD outputs a current $I_2$ corresponding to this light component. In the circuit 84 in FIG. 2, the phase of a light component of a polarization plane having an angle of 90 degrees relative to the reference polarization plane is delayed by ¼ wavelength, and thereafter, a light component of a polarization plane having an angle of 45 degrees relative to the reference polarization plane is extracted from the branched light, and a PD outputs a current $I_3$ corresponding to this light component. As is well known, the Stokes parameters can be obtained from the currents $I_0$, $I_1$, $I_2$, and $I_3$ using the following equations.

$$S_0 = I_0 \tag{6}$$

$$S_1 = 2 \times I_1 - I_0 \tag{7}$$

$$S_2 = 2 \times I_2 - I_0 \quad (8)$$

$$S_3 = 2 \times I_3 - I_0 \quad (9)$$

Figure 2:
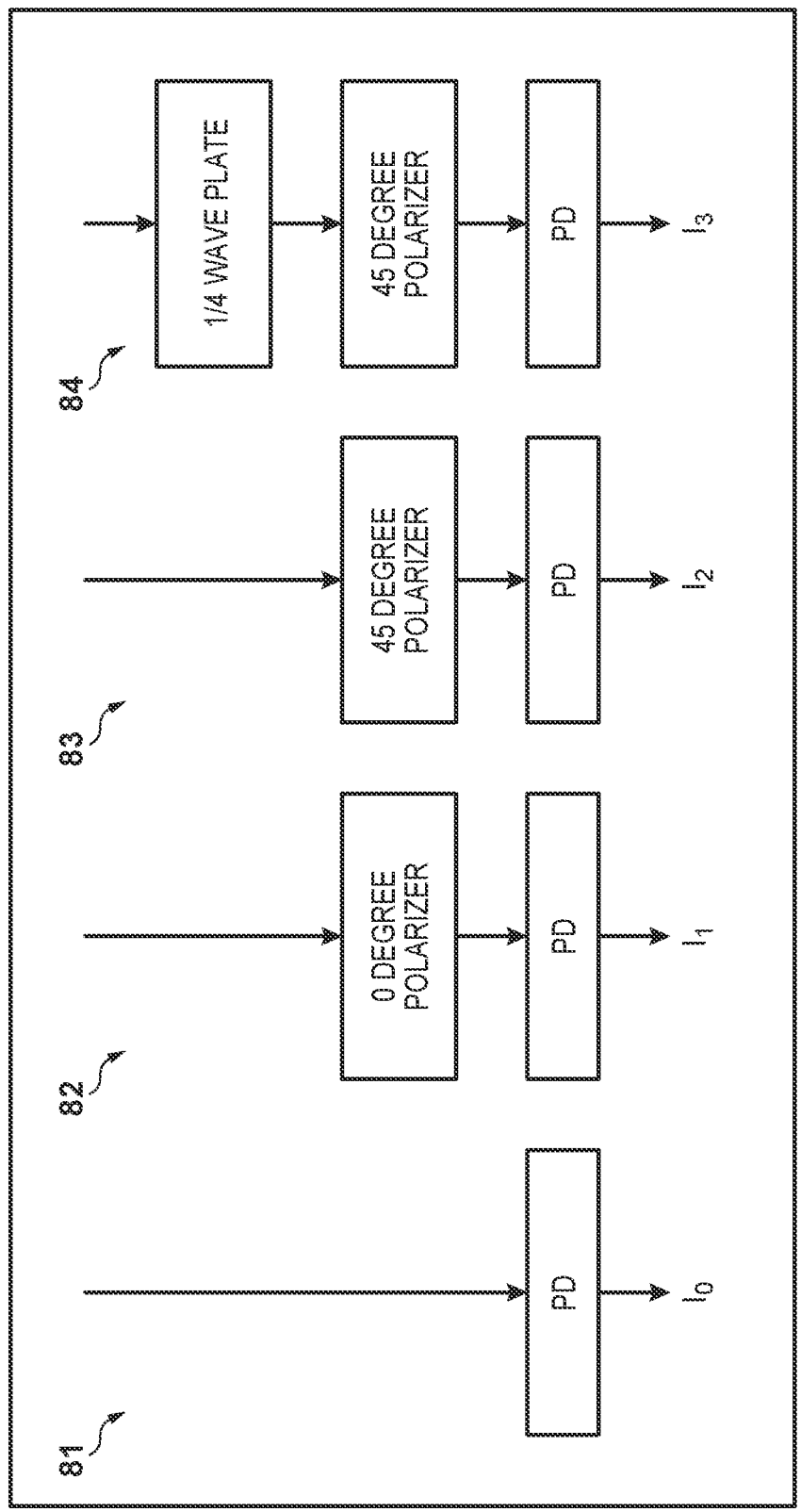
FIG. 2 is a diagram illustrating measurement of Stokes parameters.

Here, the PD 52 in FIG. 1 corresponds to the circuit 81 in FIG. 2, the 45 degree polarizer 41 and the PD 51 in FIG. 1 correspond to the circuit 83 in FIG. 2, and the ¼ wave plate 31, the 45 degree polarizer 42, and the PD 53 in FIG. 1 correspond to the circuit 84 in FIG. 2. That is, the PD 52 in FIG. 1 outputs the aforementioned current $I_0$ with respect to the combined light, the PD 51 outputs the aforementioned current $I_2$ with respect to the combined light, and the PD 53 outputs the aforementioned current $I_3$ with respect to the combined light.

Therefore, $S_2$ and $S_3$ can be obtained from Equations (8) and (9) based on the current $I_0$ output from the PD 52, the current $I_2$ output from the PD 51, and the current $I_3$ output from the PD 53. Here, the subtracter 71 subtracts half the amplitude of the electric signal (current $I_0$) output from the PD 52 from the electric signal (current $I_2$) output from the PD 51, and therefore the output of the subtracter 71 indicates $S_2$. Meanwhile, the subtracter 72 subtracts half the amplitude of the electric signal (current $I_0$) output from the PD 52 from the electric signal (current $I_3$) output from the PD 53, and therefore the output of the subtracter 72 indicates $S_3$. Accordingly, the electric signals output from the subtracters 71 and 72 based on the optical signals output from the 1×3 coupler 21 are converted to digital signals, and the digital signals are input to an unshown processing unit. These electric signals correspond to the signals obtained by coherent-detecting the Y polarized component of the signal light, as described above. Similarly, the electric signals output from the two subtracters based on the optical signals output from the 1×3 coupler 22 are converted to digital signals, and the digital signals are input to the unshown processing unit. Because the X polarized component of the original signal light is input to the 1×3 coupler 22, these electric signals correspond to signals obtained by coherent-detecting the X polarized component of the signal light. Therefore, the processing unit can demodulate the signal light based on these four electric signals.

As is apparent from the configuration of FIG. 1, six PDs and four ADCs are needed in the optical receiver of the present embodiment, similarly to the configuration described in Non-Patent Literature 1. However, in the optical receiver of the present embodiment, simple reduction processing need only be performed on the two electric signals in an analog domain in each of the subtracters 71 and 72, and complicated addition/subtraction in an analog region need not be performed.

Note that, similarly to the other configuration of Non-Patent Literature 1, the configuration can be changed such that the addition/subtraction in an analog domain is performed in a digital domain. In this case, the three electric signals output from the PDs 51 to 53 are respectively converted to digital signals by three ADCs, and the digital signals are input to the processing unit. Here, the value indicated by the digital signal based on the output of the PD 52 is denoted as a first digital value, the value indicated by the digital signal based on the output of the PD 51 is denoted as a second digital value, and the value indicated by the digital signal based on the output of the PD 53 is denoted as a third digital value. The processing unit obtains a fourth digital value by multiplying the first digital value by a predetermined coefficient. Note that the predetermined coefficient is 0.5. Also, the processing unit obtains $S_2$ by subtracting the fourth digital value from the second digital value, and obtains $S_3$ by subtracting the fourth digital value from the third digital value. In this case, although six PDs and six ADCs are used similarly to the other configuration of Non-Patent Literature 1, the processing load in digital computation in the processing unit can be reduced relative to the other configuration of Non-Patent Literature 1.

Figure 3:
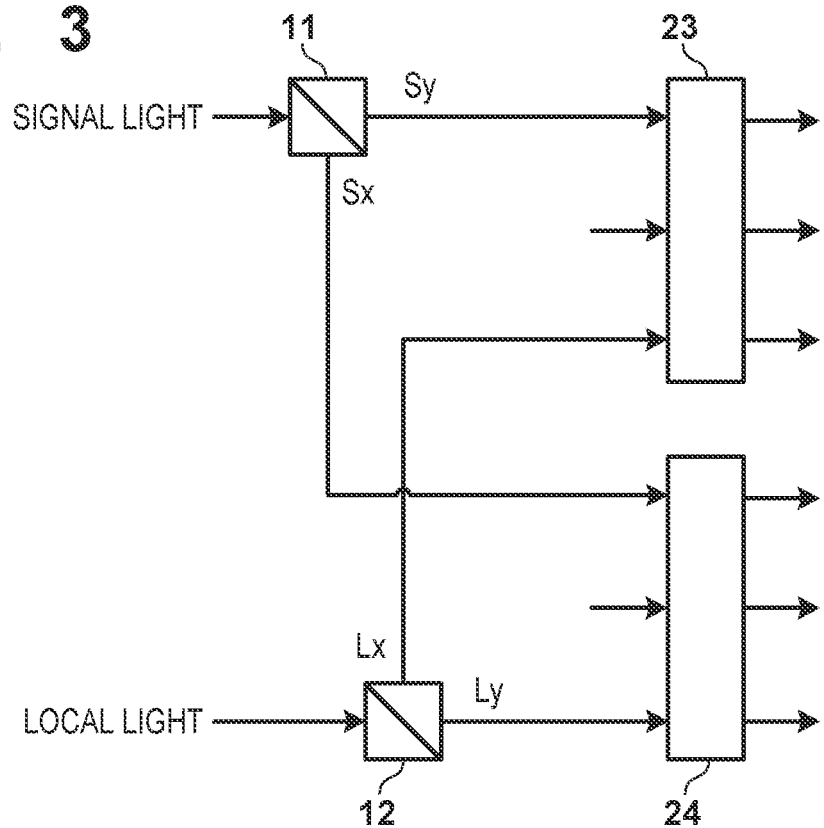
FIG. 3 is a diagram illustrating a replacement mode of the optical receiver in FIG. 1.

Note that the polarization beam splitters 13 and 14 and the 1×3 couplers 21 and 22 in FIG. 1 can also be replaced by 3×3 couplers 23 and 24, as shown in FIG. 3. The 3×3 coupler 23 combines the input signal light Sy and local light Lx, branches the combined light into three light beams, and outputs the three branched light beams. Similarly, the 3×3 coupler 24 combines the input signal light Sx and local light Ly, branches the combined light into three light beams, and outputs the three branched light beams.

Figure 4:
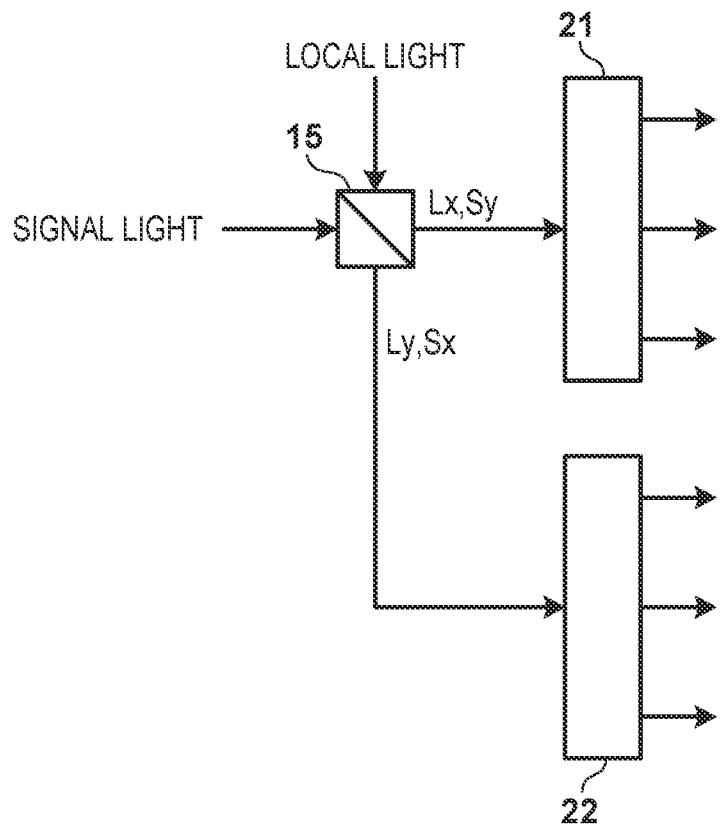
FIG. 4 is a diagram illustrating another replacement mode of the optical receiver in FIG. 1.

Furthermore, in the configuration in FIG. 1, the polarization beam splitter 11 polarization-separates the signal light, the polarization beam splitter 12 polarization-separates the local light, and the polarization beam splitters 13 and 14 each combine signal light and local light that are orthogonally polarized to each other. However, the polarization beam splitters 11 to 14 can also be replaced by a polarization beam splitter 15, as shown in FIG. 4. The polarization beam splitter 15 shown in FIG. 4 deflects the X polarized component of input light by 90 degrees, and allows the Y polarized component to pass straight. Therefore, as a result of changing the incident directions of the local light and the signal light by 90 degrees, the polarization beam splitter 15 outputs light obtained by combining the signal light Sx and the local light Ly, and light obtained by combining the signal light Sy and the local light Lx. Moreover, an MZI (Mach-Zehnder interferometer) type polarization beam splitter can be used as the polarization beam splitter 15 in FIG. 4, and in this case, the incident directions of the local light and the signal light need not be adjusted so as to be orthogonal to each other.

Note that, in the embodiment described above, it is assumed that the 1×3 couplers 21 and 22 each branch an input optical signal to three optical signals having an equal amplitude (equal power), and output the branched optical signals, and the branching unit 61 outputs electric signals having half the amplitude of the electric signal output from the PD 52. In this case, the subtracter 71 can output an electric signal indicating $S_2$ by performing subtraction of the two input signals, and subtracter 72 can output an electric signal indicating $S_3$ by performing subtraction of the two input signals. However, the electric power of the electric signal output from the branching unit 61 decreases to a quarter of the electric power of the input electric signal. Hereinafter, a case will be described where a branching unit that outputs an electric signal having half the electric power of the electric signal output from the PD 52 is used as the branching unit 61, in order to suppress degradation of the signal-to-noise ratio (SN ratio).

First, in this case, the branching unit 61 outputs electric signals having an amplitude that is $1/(\sqrt{2})$ times the amplitude of the electric signal output from the PD 52. As described above, in order for the subtracters 71 and 72 to output electric signals indicating $S_2$ and $S_3$ by performing subtraction of input two signals, the amplitude of each of the electric signals input to the plus terminals of the subtracters 71 and 72 must be twice the amplitude of the signal output from the branching unit 61. That is, the amplitude of each of the electric signals input to the plus terminals of the subtracters 71 and 72 must be $\sqrt{2}$ times the amplitude of the signal output from the PD 52. Here, the photodiode outputs an electric signal having an amplitude that is proportional to input light power. Therefore, in this case, the 1×3 couplers 21 and 22 each need only branch the input optical signal such that the power ratio of the branched optical signals is $\sqrt{2}:1:\sqrt{2}$. That is, the 1×3 coupler 21 need only output an optical signal having power that is $\sqrt{2}$ times the power of the optical signal to be output to the PD 52 to each of the 45 degree polarizer 41 and the ¼ wave plate 31. The same applies to the 1×3 coupler 22. Also, when the three electric signals output from the PDs 51 to 53 are converted to digital signals, in order to be subjected to processing, by three ADCs, the aforementioned predetermined coefficient need only be $1/\sqrt{2}$.

The present invention is not limited to the above embodiments and various changes and modifications can be made within the spirit and scope of the present invention. Therefore, to apprise the public of the scope of the present invention, the following claims are made.

The invention claimed is:

1. An optical receiver comprising:
   a first combiner configured to output first combined light by combining local light of first polarization and signal light of second polarization that is orthogonal to the first polarization;
   a first converter configured to convert the first combined light to a first electric signal;
   a first polarizer configured to allow a component of polarization plane having an angle of 45 degrees relative to each of polarization planes of the first polarization and the second polarization to pass through;
   a second converter configured to covert a component of the first combined light that has passed through the first polarizer to a second electric signal;
   a first wave plate configured to delay light of the first polarization or the second polarization by ¼ wavelength;
   a second polarizer configured to allow a component of polarization plane having an angle of 45 degrees relative to each of polarization planes of the first polarization and the second polarization to pass through;
   a third converter configured to convert a component of the first combined light that has passed through the first wave plate and the second polarizer to a third electric signal;
   a first divider configured to output a fourth electric signal and a fifth electric signal by branching the first electric signal;
   a first subtractor configured to subtract the fourth electric signal from the second electric signal; and
   a second subtractor for subtracting the fifth electric signal from the third electric signal.

2. The optical receiver according to claim 1,
   wherein the first combiner outputs the first combined light having the same electric power to each of the first converter, the first polarizer, and the first wave plate, and
   the first divider branches the first electric signal, and outputs the fourth electric signal and the fifth electric signal each having an amplitude that is half the amplitude of the first electric signal.

3. The optical receiver according to claim 1,
   wherein the first combiner outputs the first combined light to each of the first converter, the first polarizer, and the first wave plate,
   the electric power of the first combined light that is output to each of the first polarizer and the first wave plate is electric power that is $\sqrt{2}$ times the electric power of the first combined light that is output to the first converter, and
   the first divider branches the first electric signal, and outputs the fourth electric signal and the fifth electric signal each having electric power that is half the electric power of the first electric signal.

4. The optical receiver according to claim 1, further comprising:
   a second combiner configured to output second combined light by combining local light of the second polarization and signal light of the first polarization;
   a fourth converter configured to convert the second combined light to a sixth electric signal;
   a third polarizer configured to allow a component of polarization plane having an angle of 45 degrees relative to each of polarization planes of the first polarization and the second polarization to pass through;
   a fifth converter configured to convert a component of the second combined light that has passed through the third polarizer to a seventh electric signal;
   a second wave plate configured to delay light of the first polarization or the second polarization by ¼ wavelength;
   a fourth polarizer configured to allow a component of polarization plane having an angle of 45 degrees relative to each of polarization planes of the first polarization and the second polarization to pass through;
   a sixth converter configured to convert a component of the second combined light that has passed through the second wave plate and the fourth polarizer to an eighth electric signal;
   a second divider configured to output a ninth electric signal and a tenth electric signal by branching the sixth electric signal;
   a third subtractor configured to subtract the ninth electric signal from the seventh electric signal; and
   a fourth subtractor configured to subtract the tenth electric signal from the eighth electric signal.

5. The optical receiver according to claim 4, further comprising:
   a first splitter configured to output local light of the first polarization and local light of the second polarization by polarization-separating light emitted from a light source; and
   a second splitter configured to output signal light of the first polarization and signal light of the second polarization by polarization-separating light received from an optical transmission line.

6. An optical receiver comprising:
   a first combiner configured to output first combined light by combining local light of first polarization and signal light of second polarization that is orthogonal to the first polarization;
   a first converter configured to convert the first combined light to a first electric signal;
   a first polarizer configured to allow a component of polarization plane having an angle of 45 degrees relative to each of polarization planes of the first polarization and the second polarization to pass through;
   a second converter configured to convert a component of the first combined light that has passed through the first polarizer to a second electric signal;
   a first wave plate configured to delay light of the first polarization or the second polarization by ¼ wavelength;

a second polarizer configured to allow a component of polarization plane having an angle of 45 degrees relative to each of polarization planes of the first polarization and the second polarization to pass through;

a third converter configured to convert a component of the first combined light that has passed through the first wave plate and the second polarizer to a third electric signal;

a first digital converter configured to output a first digital value by digitally converting the first electric signal;

a second digital converter configured to output a second digital value by digitally converting the second electric signal;

a third digital converter configured to output a third digital value by digitally converting the third electric signal; and a processor configured to perform processing in which a fourth digital value is obtained by multiplying the first digital value by a predetermined coefficient, and the fourth digital value is subtracted from the second digital value, and processing in which the fourth digital value is subtracted from the third digital value.

7. The optical receiver according to claim 6, wherein the predetermined coefficient is 0.5.

8. The optical receiver according to claim 6, wherein the predetermined coefficient is $1/\sqrt{2}$.

9. A coherent optical reception method comprising:

outputting first combined light by combining local light of first polarization and signal light of second polarization that is orthogonal to the first polarization;

converting the first combined light to a first electric signal;

extracting a component of polarization plane having an angle of 45 degrees relative to each of polarization planes of the first polarization and the second polarization from the first combined light, and converting the extracted component to a second electric signal;

extracting, after delaying local light of the first polarization or signal light of the second polarization that is included in the first combined light by ¼ wavelength, a component of polarization plane having an angle of 45 degrees relative to each of polarization planes of the first polarization and the second polarization, and converting the component to a third electric signal;

generating a fourth electric signal and a fifth electric signal by branching the first electric signal;

subtracting the fourth electric signal from the second electric signal; and subtracting the fifth electric signal from the third electric signal.

10. A coherent optical reception method comprising:

outputting first combined light by combining local light of first polarization and signal light of second polarization that is orthogonal to the first polarization;

converting the first combined light to a first electric signal;

extracting a component of polarization plane having an angle of 45 degrees relative to each of polarization planes of the first polarization and the second polarization from the first combined light, and converting the extracted component to a second electric signal;

extracting, after delaying local light of the first polarization or signal light of the second polarization that is included in the first combined light by ¼ wavelength, a component of polarization plane having an angle of 45 degrees relative to each of polarization planes of the first polarization and the second polarization, and converting the component to a third electric signal;

outputting a first digital value by digitally converting the first electric signal;

outputting a second digital value by digitally converting the second electric signal;

outputting a third digital value by digitally converting the third electric signal; and performing processing in which a fourth digital value is obtained by multiplying the first digital value by a predetermined coefficient, and the fourth digital value is subtracted from the second digital value, and processing in which the fourth digital value is subtracted from the third digital value.

* * * * *